Aug. 31, 1965
B. H. KRYZER
3,203,602
LINE PRESSURE OPERATED METERING DEVICE
FOR WATER CONDITIONING SYSTEM
Filed June 5, 1963
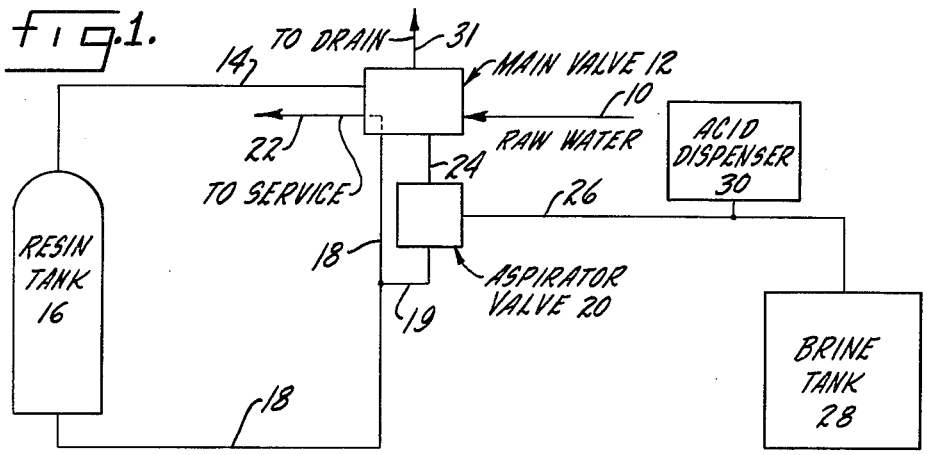
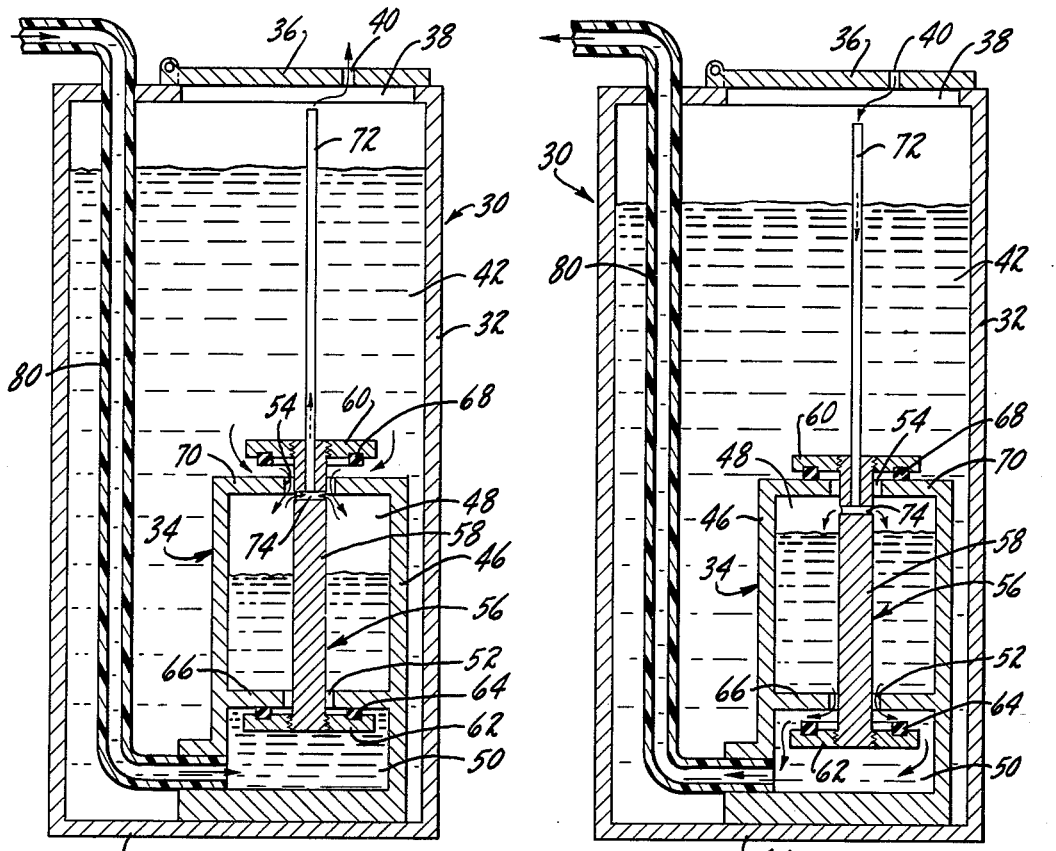
INVENTOR.
Benjamin H. Kryzer,
BY
Byron, Hume, Groen & Clement
Attorneys.

United States Patent Office 3,203,602
Patented Aug. 31, 1965

3,203,602
LINE PRESSURE OPERATED METERING DEVICE
FOR WATER CONDITIONING SYSTEM
Benjamin H. Kryzer, St. Paul, Minn., assignor to Union Tank Car Company, Chicago, Ill., a corporation of New Jersey
Filed June 5, 1963, Ser. No. 285,658
7 Claims. (Cl. 222—442)

This invention relates to means for dispensing a liquid and, more particularly, to an acid dispenser suitable for use in a water softening system.

Water softening with ion exchange resin particles is well known in the art. After prolonged contact of the ion exchange resin particles with raw water during the service cycle, these resin particles become "exhausted," i.e., their ability to exchange soft ions for the hard ions in the raw water is substantially diminished. When the ion exchange resin particles become exhausted, they must be regenerated. Heretofore, regeneration has been effected by contacting the resin particles with a brine solution, e.g., an aqueous solution of sodium chloride. More recently, it has been found that improved regeneration of the ion exchange resin particles is achieved by contacting the resin particles with an aqueous acid solution, such as citric acid or the like, and the brine solution. A sequential process may be employed wherein the resin particles are contacted first with the acid solution and then the brine solution. Likewise, the resin particles may be simultaneously contacted with the acid solution and the brine solution. These processes are discussed in detail in copending application Serial No. 170,043, filed January 31, 1962, now abandoned, and assigned to the assignee of the present application. In any event, such processes require means to dispense the aqueous acid solution which is to be contacted with the resin particles during the regeneration cycle.

Accordingly, it is an object of the present invention to provide a means for dispensing a liquid.

It is another object of the present invention to provide a means for dispensing a predetermined amount of liquid.

It is a further object of the present invention to provide a liquid dispenser adapted to dispense a predetermined amount of a liquid to a line, the liquid dispenser being actuated by the pressure in the line.

It is still another object of the present invention to provide means for dispensing a predetermined amount of an aqueous acid solution.

It is yet another object of the present invention to provide an acid dispenser for a water softening system.

It is a still further object of the present invention to provide a metering device for a liquid dispenser.

It is another object of the present invention to provide a metering device for a liquid, the metering device being adapted to be insertable into a container for the liquid.

These and other objects more apparent hereinafter are realized by the liquid dispenser embodying the features of the present invention. The liquid dispenser is adapted to dispense a predetermined amount of liquid to a line to which it is attached. The pressure in the line actuates the liquid dispenser. A metering device embodying the features of the present invention receives and dispenses the predetermined amount of liquid and is adapted to be used with various containers for the liquid.

The invention, both as to its organization and method of operation, taken with further objects and advantages thereof, will be understood by reference to the following description taken in conjunction with the accompanying drawings, in which:

FIGURE 1 is a schematic diagram of a water softening system wherein water is treated with ion exchange resin particles which are regenerated by an acid solution and a brine solution, the acid solution being supplied from an acid dispenser embodying the features of the present invention;

FIGURE 2 is a cross-sectional view of the acid dispenser shown in FIGURE 1 as a metering device in the acid dispenser is being filled with acid solution; and FIGURE 3 is a cross-sectional view of the acid dispenser of FIGURE 1 as acid solution is being dispensed to the ion exchange resin particles.

Referring to the drawings, and more particularly to FIGURE 1, there is schematically illustrated a water softening system for treating water with ion exchange resin particles. Suitable ion exchange resin particles are well known in the art and do not constitute a part of the present invention. In this system the ion exchange resin particles, when they become exhausted, are regenerated sequentially with an acid solution and a brine solution.

During the service cycle, raw water from a suitable source is passed through a feed line 10 to a main valve indicated generally by reference numeral 12. The main valve 12 directs the raw water through a line 14 to a resin tank 16 which contains a bed of the ion exchange resin particles as is well known in the art. The raw water passes through the bed of ion exchange resin particles and is withdrawn from the tank 16 through a line 18. The treated water, which has been softened by contact with the ion exchange resin particles, passes through the line 18 to the main valve 12 which diverts it to a service line 22. There is, of course, no mixing of the treated water with the raw water in the main valve 12.

After a predetermined quantity of raw water has passed through the resin tank 16, the ion exchange resin particles lose their capacity to effectively soften the raw water and must be regenerated. This is effected by sequentially contacting the exhausted resin particles with an acid solution and a brine solution. The regeneration cycle is initiated by actuating the main valve 12 so that a portion of the raw water from the line 10 is directed to the service line 22. In this manner, a supply of water is maintained to the service line 22 during the regeneration cycle. The remainder of the raw water is directed by the main valve 12 through a line 24 into an aspirator valve 20. As the raw water passes through the aspirator valve 20 in this direction a partial vacuum, i.e., a pressure less than atmospheric pressure, is created therein and in a line 26 which communicates with the aspirator valve 20, a brine tank 28 and an acid dispenser 30 embodying the features of the present invention. By virtue of the partial vacuum, created in the line 26, a predetermined amount of acid solution is drawn from the acid dispenser 30 and brine solution is drawn from the brine tank 28. The acid solution and brine solution pass sequentially through the line 26 into the aspirator valve 20 and through a line 19 to the line 18 and into the tank 16. Suitable valve means (not shown) prevent acid solution and brine solution from passing directly from the line 18 into the main valve 12. After passing upwardly through the bed of resin particles in the tank 16, and thereby regenerating the resin particles, the acid solution and brine solution are passed to drain through a line 32 after passing through the line 14 and the main valve 12. The main valve 12 prevents the raw water from mixing with the brine solution and acid solution. Likewise, the acid and brine solutions cannot enter the service line 22.

When the regeneration of the resin particles in the tank 16 is complete, the regeneration cycle is terminated by actuating the main valve 12 so that the raw water passes through the line 14, the tank 16, the line 18, the main valve 12, and the service line 22, as discussed hereinbefore. During the service cycle some of the treated water passes through the line 19 and the aspirator valve 20 to the line 26 to supply make-up water to the brine tank 28, as is well known in the art. The line 26 has suitable valve means (not shown) in the brine tank 28 to automatically terminate the flow of make-up water to the brine tank 28 after sufficient make-up water has been added thereto. Valve means for this purpose are well known in the art and do not constitute a part of the present invention. The make-up water dissolves solid sodium chloride or the like in the brine tank 28 to form the brine solution utilized in the next regeneration cycle.

As will be more fully explained hereinafter, the high pressure (greater than atmospheric pressure) of the treated water in the line 26 causes the acid dispenser 30 to meter another predetermined amount of acid solution during the service cycle so that the acid dispenser 30 is ready to discharge this acid solution to the line 26 during the regeneration cycle. The partial vacuum or low pressure in the line 26 during the regeneration cycle actuates the acid dispenser 30 whereupon it dispenses the predetermined amount of acid solution which has been metered during the service cycle.

The main valve 12 does not constitute a part of the present invention and suitable valves for this purpose are well known in the art, e.g., the main valve disclosed in United States Patent No. 2,999,514, assigned to the assignee of the present application. Another suitable valve is disclosed in copending application Serial No. 190,995, filed April 30, 1962, and assigned to the assignee of the present application. Similarly, suitable aspirator valves 20 are well known in the art. However, it is preferred in this system to employ an aspirator valve of the type disclosed in copending applications Serial No. 170,403, filed January 31, 1962, now abandoned, and Serial No. 191,767, filed May 2, 1962, now Patent No. 3,157,181, which are assigned to the assignee of the present application. The system may, of course, be operated manually, automatically or semi-automatically by suitable means (not shown) which do not constitute a part of the present invention.

Referring to FIGURES 2 and 3, the acid dispenser 30 embodying the features of the present invention will be discussed in detail. The acid dispenser 30 comprises an acid container 32 and a metering device indicated generally by reference numeral 34. The acid container 32 is a cylindrically-shaped vessel and has a pivotally mounted lid 36 adapted to open and close an opening 38 in the top of the container 32. The container 32 forms an acid reservoir chamber 42 which communicates with the atmosphere through a vent passageway 40 in the lid 36. A relatively large supply of a suitable aqueous acid solution, such as citric acid or the like, is in the reservoir chamber 42 as shown in FIGURES 2 and 3. The acid container 32 may be made of suitable metal or plastic material, depending upon the acid solution employed.

The metering device 34, in this instance, rests upon the bottom 44 of the container 32 in the reservoir chamber 42. The metering device 34 comprises a generally cylindrical body member 46, made of metal, plastic or other suitable material, forming a metering chamber 48 and a pressure chamber. A passageway 52 connects the metering chamber 48 and the pressure chamber 50. The metering chamber 48 communicates with the reservoir chamber 42 through a passageway 54 in the top 70 of the body member 46. As shown in FIGURES 2 and 3, the metering chamber 48 is positioned above the pressure chamber 50. The metering device 34 is connected to the line 26 by suitable tubing, in this instance a flexible plastic tube 80, which communicates with the pressure chamber 50. The tube 80 is connected to the body member 46 by suitable means not shown in the figures.

The body member 46 has associated therewith a valve means, indicated generally by reference numeral 56, which is adapted to open and close the passageways 52 and 54. The valve means 56 includes a valve stem 58 which extends through the passageways 54 and 52 and has a first valve closure member 60 attached to one end and a second valve closure member 62 attached to the other end. The valve stem 58 is a rod-shaped member made, in this instance, of metal and has threaded ends. The valve closure members 60 and 62 are annular-shaped members made, in this instance, of metal and have their central openings threaded for attachment to the valve stem 58. The valve stem 58 and the valve closure members 60 and 62 may, of course, be made of plastic material, the selection of the particular material utilized for these members being dependent generally upon the acid solution to be employed in the dispenser 30. The valve closure member 62 has an annular sealing means 64, such as a rubber O-ring or the like, attached thereto and adapted to engage an annular-shaped inwardly extending flange 66 of the body member 46 to close the passageway 52. Similarly, the valve closure member 60 has an annular sealing means 68, such as a rubber O-ring or the like, attached thereto and adapted to engage the top 70 of the body member 46 to close the passageway 54. As shown in FIGURES 2 and 3, the valve closure member 60 is in the reservoir chamber 42 while the valve closure member 62 is in the pressure chamber 50. The valve stem 58 is of sufficient length so that the passageway 54 is open when the valve closure member 62 has closed the passageway 52 and the passageway 52 is open when the valve closure member 60 has closed the passageway 54. As will be seen in FIGURES 2 and 3, the valve means 56 may move laterally within the passageways 52 and 54. However, the size of the passageways 52 and 54 relative to the size of valve closure members 62 and 60, respectively, and the valve stem 58 is such that when the valve means 56 is in its upward position the passageway 52 is closed and when the valve means 56 is in its downward position the passageway 54 is closed, regardless of the lateral movement of the valve means 56.

A vent tube 72 threadedly engages the valve stem 58 and extends upwardly to the top portion of the reservoir chamber 42. The vent tube 72 has a passageway therein communicating with a passageway 74 in the valve stem 58. The passageway 74 comunicates at its ends with the metering chamber 48. In this manner, the passageway 74 and the vent tube 72 allow air to be vented from the metering chamber 48 as acid solution passes into the metering chamber 48 from the reservoir chamber 42, as will be described in more detail hereinafter.

The metering device 34 is installed in the container 32 by attaching the tubing 80 to the body member 46 and placing the body member 46 in the container 32. Acid solution may be in the container 32 when the metering device 34 is placed therein or the acid solution may be added subsequent to placing the metering device 34 in the container 32. The metering device 34 is placed in the container 32 through the opening 38. As shown in FIGURE 2, the level of acid solution in the container 32 is above the top 70 of the metering means 34 but below the top of the vent tube 72.

Assuming that the water softening system is in its service cycle, the line 26 will then be placed under a high pressure by virtue of the treated water therein. The treated water under high pressure will pass from the line 26 to the tube 80 and enter the pressure chamber 50. The high pressure water causes the valve member 56 to move upwardly to the position shown in FIGURE 2. In this position, the sealing means 64 of the valve closure member 62 engages the flange 66 and closes the passageway 52. Simultaneously, the valve closure member 60 moves upwardly and opens the passageway 54. In this manner, acid solution flows from the reservoir chamber 42 through the passageway 54 into the metering chamber 48. Air displaced from the metering chamber 48 by the entering acid solution is removed through the passageway 74 in the valve stem 58 and the vent tube 72. The flow of acid solution continues until the meeting chamber 48 has been completely filled with acid solution and, in addition, acid solution has filled the passageway 74 and the vent tube 72. The acid solution will fill the vent tube 72 to the extent that it will attain the same level therein as the level of the acid solution in the reservoir chamber 42. The dispenser 30 is now ready to discharge a predetermined amount of acid solution.

When the resin particles are ready for regeneration, the regeneration cycle is initiated and the line 26 placed under a partial vacuum or low pressure as described hereinbefore. Accordingly, the line 80 and the pressure chamber 50 are likewise placed under a partial vacuum or low pressure. By virtue of the pressure differential between the metering chamber 48 and the pressure chamber 50, the valve member 56 moves downwardly until the sealing means 68 of the flange member 60 engages the top member 70 of the body member 46 and closes the passageway 54. This downward movement of the valve member 56 is rapid and simultaneously opens the passageway 52 whereby acid solution in the metering chamber 48 passes through the passageway 52 and into the chamber 50. The acid solution passing to the pressure chamber 50 is withdrawn therefrom through the line 80 and passes to the line 26 and the resin tank 16. The flow of acid solution in this manner continues until all of the acid solution has been withdrawn from the metering chamber 48, the passageway 74 and the vent tube 72.

After the regeneration cycle has been completed, the service cycle is initiated again and the cycle of the acid dispenser 30 repeated. Accordingly, during each regeneration cycle the acid dispenser 30 will discharge to the line 26 substantially the same amount of acid solution, which, of course, is determined principally by the size of the metering chamber 48. In this manner, the acid dispenser 30 is adapted to dispense a predetermined amount of acid solution to the line 26 in the water softening system during each regeneration cycle.

When the level of the acid solution in the reservoir chambr 42 approaches the level of the passageway 54 additional acid solution must be added to the reservoir chamber 42, e.g., through the opening 38 in the container 32. In alternative, the metering device 34 may be removed from the reservoir chamber 42 and placed in another acid container.

The pressure of the treated water during the high pressure cycle of the line 26 is, of course, sufficiently large to place a greater force on the valve closure member 62 than the weight of the valve means 56 and the force placed on the valve closure member 60 by atmospheric pressure and the head of acid solution above the valve closure member 60. In this manner, the valve means must move to the position shown in FIGURE 2 during the high pressure cycle. The relative sizes of the closure members 60 and 62 may be varied to assure the desired upward movement of the valve means 56 during the high pressure cycle if this is necessary. Similarly, the valve means 56 moves downwardly during the low pressure cycle since the downward force on the valve closure member 60 is greater than atmospheric pressure and the upward force in the vlave closure member 62 is less than atmospheric pressure. If desired, the valve means 56 may be made of low density material so that it is floatable in the treated water and/or acid solution. Suitable plastic materials could, for example, the employed in such a modification. In that instance, the low pressure during the regeneration cycle would have to be sufficient to overcome the buoyancy force of the valve means 56. Similarly, the valve means 56 may be spring-biased toward its upper position shown in FIGURE 2 and in such an instance the low pressure during the regeneration cycle would have to overcome the force of the spring means, also.

Though the metering device 34 is in this instance resting upon the floor 44 of the container 32, it may be mounted permanently within the container 32 if so desired. Furthermore, the metering device 34 need not be in the container 32 so long as it communicates with a reservoir chamber which will allow acid solution to flow by gravity into the metering chamber 48 through the passageway 54.

If it is desired to simultaneously contact the resin particles in the tank 16 with acid solution and brine solution, this may be effected by altering the piping from the aspirator valve 20. In such instances, the acid solution and brine solution are mixed in the aspirator valve 20 or in a line connected thereto as the acid solution and brine solution travel to the resin tank 16.

Though the dispenser 30 has been discussed in detail with respect to dispensing acid solutions, it may be used to dispense any liquid by constructing its parts of suitable material.

While the embodiment described herein is at present considered to be preferred, it will be understood that various modifications and improvements may be made therein and it is intended to cover in the appended claims all such modifications and improvements as fall within the true spirit and scope of the invention.

What is claimed is:

1. A metering device comprising a body member having a pressure chamber and a metering chamber therein, said metering chamber being adapted to receive liquid from a reservoir chamber containing a liquid, said metering chamber and said pressure chamber communicating with one another, a valve means associated with said body member and having a first and second position, said first position preventing liquid from flowing from said pressure chamber to said metering chamber while allowing liquid to flow from said reservoir chamber to said metering chamber and said second position allowing liquid to flow from said metering chamber to said pressure chamber while preventing liquid from flowing from said reservoir chamber to said metering chamber, and vent means attached to said valve means to remove air displaced from said metering chamber as liquid enters said metering chamber.

2. A metering device comprising a body member having a pressure chamber and a metering chamber therein, said metering chamber being adapted to receive liquid from a reservoir chamber containing a liquid, said metering chamber and said pressure chamber communicating with one another, a valve means associated with said body member and having a first and second position, said first position preventing liquid from flowing from said pressure chamber to said metering chamber while allowing liquid to flow from said reservoir chamber to said metering chamber and said second position allowing liquid to flow from said metering chamber to said pressure chamber while preventing liquid from flowing from said reservoir chamber to said metering chamber, said pressure chamber communicating with a line to which liquid in the metering chamber is to be dispensed, said line having a low pressure cycle and a high pressure cycle, said valve means being actuated during said high pressure cycle to said first position and during said low pressure cycle to said second position.

3. A liquid dispenser comprising a container means forming a reservoir chamber for a liquid and a metering device, said metering device including a body member forming a pressure chamber and a metering chamber, said metering chamber being adapted to receive liquid from said reservoir chamber, said metering chamber and said pressure chamber communicating with one another, a valve means associated with said body member and having a first and second position, said first position preventing liquid from flowing from said pressure chamber to said metering chamber while allowing liquid to flow from said reservoir chamber to said metering chamber and said second position allowing liquid to flow from said metering chamber to said pressure chamber while preventing liquid from flowing from said reservoir chamber to said metering chamber, and vent means attached to said valve means to remove air displaced from said metering chamber as liquid enters said metering chamber.

4. The liquid dispenser of claim 3 wherein said valve means comprises a valve stem having a first valve closure member on one end thereof and a second valve closure member on another end thereof, said first valve closure member being adapted to open and close a first passageway in said body member through which said reservoir chamber communicates with said metering chamber and said second valve closure member being adapted to open and close a second passageway in said body member through which said metering chamber communicates with said pressure chamber.

5. A liquid dispenser comprising a container means forming a reservoir chamber for a liquid and a metering device, said metering device including a body member forming a pressure chamber and a metering chamber, said metering chamber being adapted to receive liquid from said reservoir chamber, said metering chamber and said pressure chamber communicating with one another, a valve means associated with body member and having a first and second position, said first position preventing liquid from flowing from said pressure chamber to said metering chamber while allowing liquid to flow from said reservoir chamber to said metering chamber and said second position allowing liquid to flow from said metering chamber to said pressure chamber while preventing liquid from flowing from said reservoir chamber to said metering chamber, said pressure chamber communicating with a line to which said liquid in the metering chamber is to be dispensed, said line having a low pressure cycle and a high pressure cycle, said valve means being actuated during said high pressure cycle to said first position and during said low pressure cycle to said second position.

6. A liquid dispenser comprising a container means for a liquid and a metering device, said metering device having a metering chamber and a pressure chamber therein, said metering chamber and said pressure chamber being interconnected by a first passageway, said container means forming a reservoir chamber for said liquid, said metering device having a second passageway therein for communication between said metering chamber and said reservoir chamber, a valve means associated with said metering chamber for opening and closing said first and second passageways, said valve means comprising a valve stem having a first valve closure member and a second valve closure member, said first valve closure member adapted to open and close said first passageway and said second valve closure member adapted to open and close said second passageway, said pressure chamber being connected to a line having a low pressure cycle and a high pressure cycle, said high pressure cycle causing said valve means to move whereby said first valve closure member closes said first passageway and said second valve closure member opens said second passageway so that liquid from said reservoir chamber passes through said second passageway to fill said metering chamber, said low pressure cycle in said line causing said valve means to move whereby said first valve closure member opens said first passageway and said second valve closure member closes said second passageway so that liquid in said metering chamber passes through said first passageway to said pressure chamber and said line, said valve member including a vent tube extending upwardly in said reservoir chamber, said vent tube communicating with said metering chamber through a third passageway in said valve means whereby air is displaced from said metering chamber as liquid flows into said metering chamber from said reservoir chamber when said second passageway is open.

7. The liquid dispenser of claim 6 wherein said metering chamber is positioned above said pressure chamber and said second passage way is vertically above said first passageway.

References Cited by the Examiner
UNITED STATES PATENTS

| 798,163 | 8/05 | Carter | 222—442 |
|---|---|---|---|
| 1,287,141 | 12/18 | Travis | 222—442 |
| 1,698,890 | 1/29 | McGill | 210—206 |
| 1,905,726 | 4/33 | Lindsay | 210—190 |
| 2,627,503 | 2/53 | Anderson | 210—190 |
| 2,801,032 | 7/57 | Hall | 222—453 X |
| 2,807,393 | 9/57 | Metrailer et al. | 222—453 X |
| 3,039,665 | 6/62 | Pfeuffer | 222—133 |
| 3,049,266 | 8/62 | Werry | 222—133 |
| 3,072,302 | 1/63 | Giovannoni et al. | 222—442 |

RAPHAEL M. LUPO, *Primary Examiner.*